US006982851B2

(12) United States Patent
Yamamoto et al.

(10) Patent No.: US 6,982,851 B2
(45) Date of Patent: Jan. 3, 2006

(54) FLYING HEAD SLIDER AND DISK STORAGE APPARATUS USING THE SAME

(75) Inventors: Kazuyuki Yamamoto, Kanagawa (JP); Kazutoshi Yamamoto, Tokyo (JP); Koji Fukumoto, Kanagawa (JP); Toshio Mamiya, Tokyo (JP)

(73) Assignee: Sony Corporation, (JP)

( * ) Notice: Subject to any disclaimer, the term of this patent is extended or adjusted under 35 U.S.C. 154(b) by 169 days.

(21) Appl. No.: 10/689,593

(22) Filed: Oct. 22, 2003

(65) Prior Publication Data

US 2004/0090708 A1     May 13, 2004

(30) Foreign Application Priority Data

Nov. 8, 2002    (JP)    ............... P2002-325791

(51) Int. Cl.
*G11B 17/32*    (2006.01)

(52) U.S. Cl. .................................. 360/235.8
(58) Field of Classification Search .. 360/235.1–235.9, 360/236.1–236.5
See application file for complete search history.

(56) References Cited

U.S. PATENT DOCUMENTS

| 6,301,079 | B1 * | 10/2001 | Hanamoto et al. | ....... 360/236.5 |
| 6,603,638 | B2 * | 8/2003 | Yotsuya | .................. 360/235.6 |
| 6,606,222 | B1 * | 8/2003 | Ryun | .................... 360/236.5 |
| 6,628,480 | B2 * | 9/2003 | Kohira et al. | ........... 360/235.6 |
| 6,735,051 | B2 * | 5/2004 | Zeng et al. | .............. 360/245.7 |
| 6,747,844 | B1 * | 6/2004 | Arai et al. | ............... 360/234.2 |
| 2002/0001157 | A1 * | 1/2002 | Kang et al. | ............. 360/236.3 |
| 2003/0206374 | A1 * | 11/2003 | Ueda et al. | ............. 360/236.3 |
| 2003/0214756 | A1 * | 11/2003 | Yamamoto et al. | ...... 360/236.3 |
| 2004/0100732 | A1 * | 5/2004 | Deng et al. | ............. 360/235.8 |
| 2004/0156144 | A1 * | 8/2004 | Kang | ..................... 360/235.8 |

FOREIGN PATENT DOCUMENTS

JP    2001-060373    3/2001

* cited by examiner

*Primary Examiner*—Allen Cao
(74) *Attorney, Agent, or Firm*—Rader, Fishman & Grauer PLLC; Ronald P. Kananen

(57) ABSTRACT

A flying head slider that keeps out dust particles while improving the CFH characteristics, skew dependence characteristics, and linear speed dependence characteristics for achieving a stable fly height. A flying head slider includes a positive pressure generating surface, which includes a leading pad for ensuring pitch stiffness; a pair of side pads, which are positioned behind of the leading pad and to the right and the left for ensuring roll stiffness; and a center pad, which is positioned between the side pads and controls the fly height characteristics. Furthermore, the flying head slider includes steps, which are at a lower height than the positive pressure generating surfaces and extend from the front of the slider toward side edges thereof in order to prevent dust particles from entering an area between the flying head slider and a disk surface.

11 Claims, 10 Drawing Sheets

← a          b →
AIR INFLOW SIDE          AIR OUTFLOW SIDE

FLYING HEAD SLIDER AND DISK STORAGE APPARATUS USING THE SAME

CROSS REFERENCE TO RELATED APPLICATIONS

The present document is based on Japanese Priority Document JP2002-325791, filed in the Japanese Patent Office on Nov. 8, 2002, the entire contents of which being incorporated herein by reference.

BACKGROUND OF THE INVENTION

1. Filed of the Invention

The present invention relates to a flying head slider for flying a head that reads data from and writes data to a disk shaped storage medium and to a disk storage apparatus in which the flying head slider is used. More specifically, the head slider includes positive pressure generating surfaces, which have shapes that would enable a flexible design, while ensuring stiffness in pitch direction and in roll direction. Steps, which are lower in height than the positive pressure generating surface, are on an air inflow side of the positive pressure generating surface and extend from a front side of the slider toward side edges thereof in order to prevent dust particles from entering into an area between the flying head slider and a disk plate and to ensure stable fly height characteristics.

2. Description of Related Art

FIGS. 10A, 10B are explanatory diagrams showing an example of a configuration of a flying head slider of a prior art, which is incorporated into a hard disk drive. FIG. 10A is a perspective view, and FIG. 10B is a plane view. Furthermore, FIG. 11 is a plane view showing an example of a configuration of a hard disk drive of a prior art. In order to describe an internal configuration of the hard disk drive in FIG. 11, a cover, which is not shown in the figure, has been removed.

A flying head slider 51 includes a positive pressure generating surface 53; a step 54, which is a shallow groove at a lower height than the positive pressure generating surface 53; and a recess 55, which is a deep groove at a lower height than the step 54; all of which are on a face that faces a disk 52 in FIG. 11.

The hard disk drive 56 includes a head actuator 59. The head actuator 59 includes a suspension 57, which supports the flying head slider 51 on a tip side, and an arm main body 58, on which the suspension 57 is secured.

The arm main body 58 of the head actuator 59 is fitted on a pivot 60, which is an axis, in a rotatable manner. Furthermore, the head actuator 59 is rotationally driven by a voice coil motor 61, which is placed on an opposite side of the suspension 57 with the pivot 60 sandwiched in between.

When the disk 52 is rotated by a spindle motor, which is not shown in the figure, a positive pressure is generated at the positive pressure generating surface 53 and generates a lifting force away from the disk 52 as a result of an air flow that accompanies the rotation of the disk 52. A negative pressure is generated at a negative pressure generating area 62, which is a shaded area in the recess 55, and generates a pulling force toward the disk 52. In this configuration, a stable fly height is achieved by a balance of forces among a load of the suspension 57, which presses the flying head slider 51 toward the disk 52; the positive pressure; and the negative pressure.

Furthermore, the voice coil motor 61 rotates the head actuator 59 and moves the flying head slider 51 between an inner edge and an outer edge of the disk 52 in order to record or reproduce information.

In the mean time, in the hard disk drive 56 the head actuator 59 rotates and moves the flying head slider 51 between the inner edge and the outer edge of the disk 52, while the disk 52 is maintained at a constant revolution speed. For this reason, a speed of the air flow varies depending on whether the flying head slider 51 is at the inner edge of the disk 52 or at the outer edge of the disk 52. Furthermore, because the flying head slider 51 moves as a result of a rotational operation of the head actuator 59, an angle of the flying head slider 51, which is called a skew angle, with respect to the air flow also varies depending on whether the flying head slider 51 is at the inner edge of the disk 52 or at the outer edge.

Therefore, shapes of, for example, the positive pressure generating surface of the flying head slider of the prior art is designed to achieve a constant flying height (CFH) and to improve skew dependence characteristics and linear speed dependence characteristics.

In other words, instead of a positive pressure generating surface 53, which has a straight edge on the air inflow side, as shown on the flying head slider 51 in FIG. 10a, a flying head slider may have a projection on the air inflow side of the positive pressure generating surface. (For example, see the Patent Document 1.)

Patent Reference Document 1

Japanese Patent Application Publication No. 2001-60373

SUMMARY OF THE INVENTION

In recent years, flying head slider flight height has been lowered in order to increase recording density on a disk storage apparatus, such as a hard disk drive, based on magnetic recording. However, as the fly height of the flying head slider is lowered, and as thickness of an air film between the positive pressure generating surface and the disk is reduced, the drive becomes more susceptible to effects of small dust particles inside the drive.

More specifically, there are problems that when the dust particles enter an area between the flying head slider and the disk, the flying head slider comes into contact with the dust particles and thus the disk surface. And a suspension would begin to oscillate at a normal mode frequency under an excitation force, and, as a result, cause a difficulty in following a track. A further problem is that an excessive amount of dust particles can cause damages on the disk and cause a head crash.

In order to address these problems, the shape of, for example, the positive pressure generating surface must be such as to inhibit the dust particles from entering. However, such a requirement can impose restrictions on design flexibility. It is often difficult to ensure protection against dust particles and improve CFH characteristics, skew dependence characteristics, and linear speed dependence characteristics, all at the same time.

The present invention addresses these issues and provides a flying head slider, that would not be susceptible to the effects of dust particles but achieves a constant fly height, and a disk storage apparatus in which the flying head slider is used.

To address the issues described above, the flying head slider of the present invention is a flying head slider, that is incorporated into a disk storage apparatus, which writes data to and reads data from a disk shaped storage medium and includes a surface that faces the storage medium and includes three types of surfaces, which are a positive pressure generating surface; a step that is at the lower height than the positive pressure generating surface; and a recess that is at a lower height than the steps. The positive pressure generating surface includes a U-shaped leading pad, which is located at a front part of the slider and includes a projecting part on an air inflow side; two side pads, which are located behind the leading pad to the right and the left; and a center pad, which is located between the two side pads and behind the leading pad and includes a recess on the air inflow side. The step includes a leading step, which extends from the front edge of the leading pad to the front edge of the slider; two side steps, which extend from the behind of the leading pad to the right and to the left, respectively, to connect to the two side pads, respectively; and a center step, which extends forward from a front edge of the center pad and includes a projection on the air inflow side. The recess is formed at the peripheries of side pads and surrounds the center pad and the center step, which are surrounded by the leading pad and the side steps. The side steps extend from the edges of the side pads to the edges of the slider and form the width of the leading pad narrower than the total width of the slider. The leading step and the side steps are joined at the sides of the slide and extend to the sides of the slide. The widths of the side steps are wider at the rear. The rear edge of the center pad is positioned further behind the rear edges of the side pads. A head is located near the rear edge on the center pad. Furthermore, the disk storage apparatus of the present invention incorporates the flying head slider described above.

With the flying head slider and the disk storage apparatus of the present invention, an airflow, which is generated as the recording medium rotates, generates a lifting force at the positive pressure generating surface away from the recording medium.

Because the U-shaped leading pad, which is the positive pressure generating surface with the projection on the air inflow side, is located at the front part of the slider, the leading pad mainly ensures stiffness in pitch direction. Furthermore, because the two side pads are placed behind the leading pad and to the right and the left, the side pads mainly ensure stiffness in roll direction.

Furthermore, because a center pad, which includes the recess on the air inflow side, is located behind the leading pad and between the two side pads, the shape of the center pad enables control over the fly height and provides a freedom in design.

Furthermore, because the steps, which are at a lower height than the positive pressure generating surfaces, extend from the front part of the slider toward the side edges at parts corresponding to the air inflow side of the positive pressure generating surfaces, the dust particles are less likely to penetrate into an area between the flying head slider and the disk. Furthermore, even in a rare instance in which the dust particles do enter, the dust particles are inhibited from traveling to the positive pressure generating surfaces, which are most susceptible to the effects of dust particles, because the dust particles flow along contours of the positive pressure generating surfaces, which include projections on the air inflow side.

As thus described, according to the present invention, as positive pressure generating surfaces of the air bearing slider includes, a U-shaped leading pad, which is at the front part of the slider and includes a projection on the air inflow side, is provided. The leading pad mainly ensures stiffness in pitch direction. Furthermore, the two side pads are provided behind the leading pad and to the right and the left, and mainly ensure stiffness in roll direction.

Furthermore, the center pad, which is between the two side pads and behind the leading pad and includes a recess on the air inflow side, makes it possible to control the fly height characteristics, when the shape of the center pad is designed appropriately. As a result, an enhanced degree of freedom in design is ensured.

Furthermore, the steps, which are at a lower height than the positive pressure generating surfaces, extend from the front part of the slider to the side edges thereof at parts corresponding to the air inflow side of the various positive pressure generating surfaces in order to inhibit the dust particles from penetrating into the area between the flying head slider and the disk.

As a result, the adverse effects of the dust particles are mitigated in the disk storage apparatus, that includes the air bearing system and is used in an environment with a lot of dust particles, or, that includes ultra low fly height air bearing system.

Furthermore, the CFH characteristics, the skew dependence characteristics, and the linear speed dependence characteristics are enhanced to achieve a stable fly height while keeping the dust particles out.

DESCRIPTION OF THE PREFERRED EMBODIMENTS

Figure 1A:
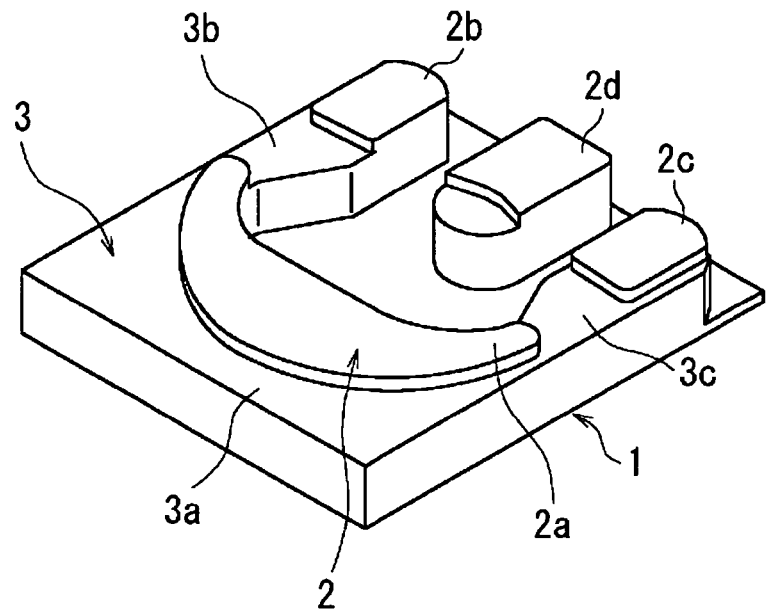
FIGS. 1A and 1B are explanatory diagrams showing an example of a configuration of a flying head slider of a first embodiment.

Embodiments of a flying head slider and a disk storage apparatus of the present invention will be described by referring to the drawings.

Figure 1B:
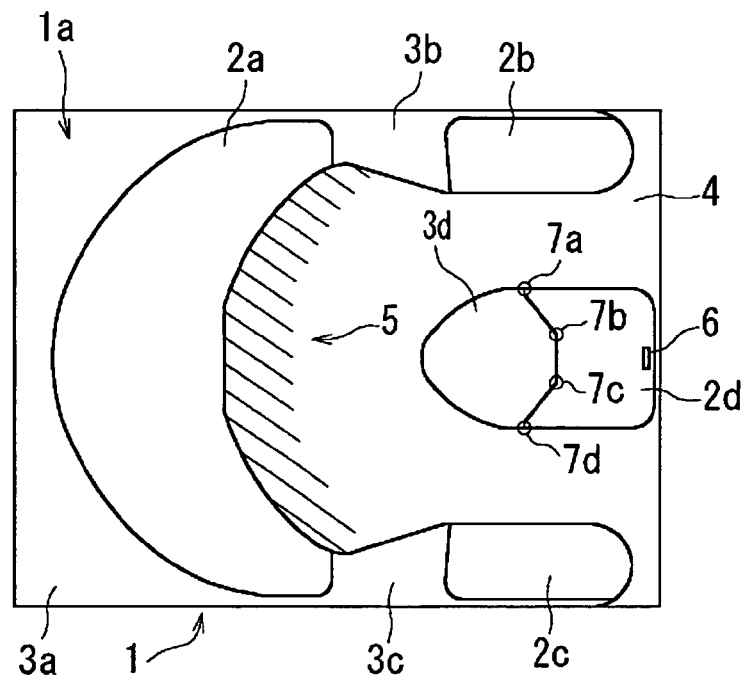

FIGS. 1A, 1B are explanatory diagrams showing an example of a configuration of a flying head slider of a first embodiment, FIG. 1A is a perspective view, and FIG. 1B is a plane view. The flying head slider of the first embodiment includes positive pressure generating surfaces 2, which are shaped to improve the constant fly height characteristics while providing a freedom of design; steps 3, which are at areas corresponding to an air inflow side and are at a lower height than the positive pressure generating surfaces 2. Because the steps 3 extend from a front part of the slider to side edges thereof, dust particles are inhibited from entering an area between the flying head slider and a disk surface.

Figure 2:
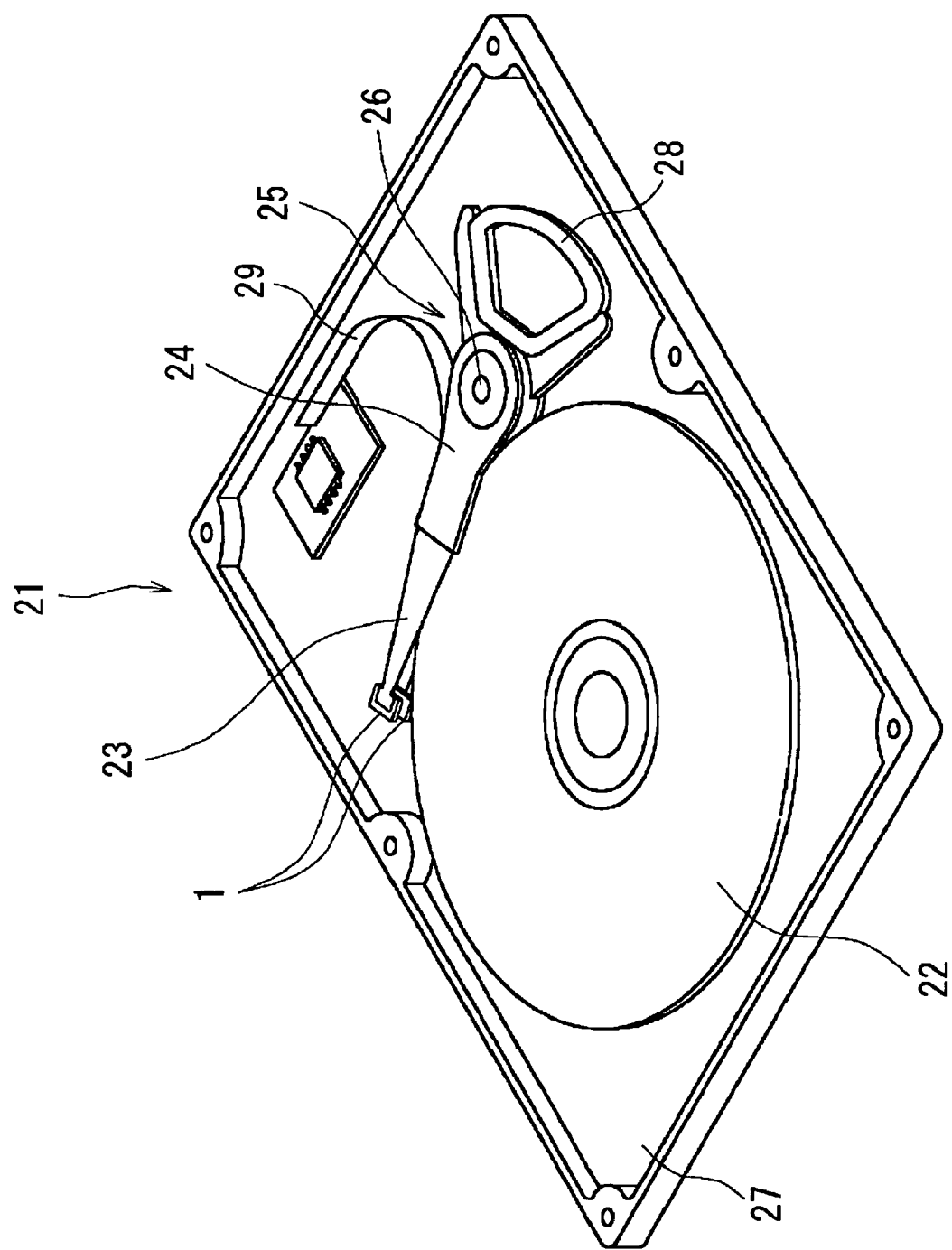
FIG. 2 is a perspective view showing an example of a configuration of a hard disk drive of the first embodiment.

The flying head slider 1 in FIGS. 1A and 1B is incorporated in a hard disk drive, which is an example of a disk storage apparatus. A configuration of the hard disk drive will be described first. FIG. 2 is a perspective view that shows an example of the configuration of the hard disk drive of the first embodiment. In order to show an internal configuration of a hard disk drive 21 in FIG. 2, a cover, which is not shown in the figure, has been removed.

The hard disk drive 21 of the first embodiment is called a fixed disk, because a disk 22, which is a storage medium, cannot be removed. The flying head slider 1 includes a magnetic head, which is not shown in the figure and records and reproduces information to and from the disk 22; is lifted by an airflow, that is generated as the disk 22 rotates; and maintains the magnetic head at a prescribed fly height above the disk 22.

The hard disk drive 21 includes a suspension 23, which supports the flying head slider 1 at a tip, and a head actuator 25, which includes an arm main body 24, on which the suspension 23 is fixed.

The arm main body 24 of the head actuator 25 is fitted around a pivot 26 in a rotatable manner on a casing 27. Furthermore, the head actuator 25 is rotationally driven by a voice coil motor 28, which is placed on an opposite side from the suspension 23 with the pivot 26 sandwiched in between.

Furthermore, power is supplied to the head actuator 25 and signals are exchanged with a magnetic head, which is not shown in the figure, by a flexible printed circuit board 29, which is fixed onto the arm main body 24.

Furthermore, as the disk 22 is rotated by a spindle motor, which is not shown in the figure, information is recorded and reproduced by rotating the head actuator 25 with the voice coil motor 28 and moving the flying head slider 1 between an inner edge and an outer edge of the disk 22.

The flying head slider 1 will be described next in detail by referring back to FIGS. 1A, 1B. Firstly, a length, width and height of the flying head slider 1 are 1.25 mm, 1.0 mm, and 0.3 mm, respectively. This flying head slider is called a 30% slider or a Pico slider. In FIG. 1B, a side indicated by an arrow a is an air inflow side or a leading side, while a side indicated by an arrow b is air outflow side or a trailing side.

An air bearing surface 1a of the flying head slider 1 faces the disk 22, which is shown in FIG. 2, includes three types of layers, which are positive pressure generating surfaces 2; steps 3, which are shallow grooves at a lower height than the positive pressure generating surfaces 2; and a recess 4, which is a deep groove at a lower height than the steps 3.

The positive pressure generating surfaces 2 include a leading pad 2a, side pads 2b, 2c, and a center pad 2d. The leading pad 2a is positioned at a front part of the flying head slider 1; is U-shaped and includes a projection on the air inflow side; has a width that spans almost entirely across a width of the flying head slider 1; is thickest at a center in the width direction; and becomes gradually narrower at both ends.

The two side pads 2b, 2c are placed behind the leading pad 2a and on the left and the right side of the flying head slider 1 and has a projection on the air inflow side. The center pad 2d is positioned behind the leading pad 2a and at the rear center of the flying head slider 1 and has a recess on the air inflow side.

The steps 3 are 0.15 µm in depth from the positive pressure generating surfaces 2 and include a leading step 3a, side steps 3b, 3c, and a center step 3d.

The leading step 3a extends from a front edge of the leading pad 2a to a front edge of the flying head slider 1. The two side steps 3b, 3c extend from two side faces of the leading pad 2a to the two side pads 2b, 2c and are connected to the two side pads 2b, 2c. The center step 3d extends frontward from a front edge of the center pad 2d and has a projection on the air inflow side. However, the center step 3d and the leading pad 2a are not connected.

The recess 4 is 1.3 µm in depth from the positive pressure generating surfaces 2 and formed at peripheries of the center pad 2d and the center step 3d, which are surrounded by the leading pad 2a, the side steps 3b, 3c, and the side pads 2b, 2c. Furthermore, an area of the recess 4, which is shaded and is surrounded by the leading pad 2a, is a negative pressure generating area 5.

Figure 3:
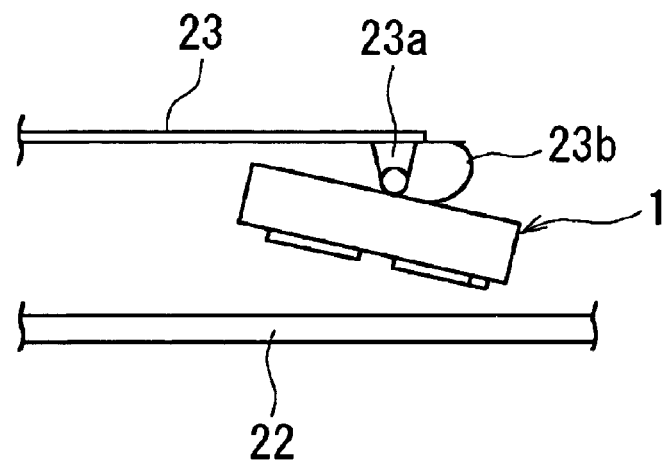
FIG. 3 is a diagram showing an example of an operation of the flying head slider.

Furthermore, a head 6, which records and reproduces signals, is positioned at a rear end of the center pad 2d. FIG. 3 is a diagram showing an example of an operation of the flying head slider. The flying head slider 1 is supported by a ball pivot 23a and a supporting member 23b having a spring property, on the suspension 23 and is able to swing.

When the disk 22 rotates, a positive pressure is generated by an airflow, that results from the rotation of the disk 22, at the leading pad 2a, the side pads 2b, 2c, and the center pad 2d of the flying head slider 1, which are shown in FIGS. 1A, 1B and generates a lifting force away from the disk 22. A negative pressure is generated at the negative pressure generating area 5 in the recess 4 and generates a pulling force towards the disk 22. This configuration is designed to achieve a constant fly height at a point of balance among a load of the suspension 23, which pushes the flying head slider 1 toward the disk 22, the positive pressure, and the negative pressure.

The flying head slider 1 lifts off at a pitch angle with the leading side up and the air inflow side lifting higher than the air outflow side. Furthermore, as shown in FIGS. 1A, 1B an area near the head 6 would be at the lowest fly height, because the rear edge of the center pad 2d, where the head 6 is located, is behind the rear edge of the side pads 2b, 2c. It should be noted that, the pitch angle shown in FIG. 3 is exaggerated. The pitch angle of the flying head slider 1 of the first embodiment is approximately 120µ radian.

On the flying head slider 1 in FIG. 1, the leading pad 2a and the side pads 2b, 2c include projections on the air inflow side, with the leading step 3a and the side steps 3b, 3c, which are at a lower height, being at the front. For this reason, dust particles would flow along contours of the leading pad 2a and the side pads 2b, 2c, and the configuration would inhibit the dust particles from traveling on to the positive pressure generating surface 2.

Although the center pad 2d has a recess on the air inflow side, the dust particles are not likely to enter the recess of the center part 2d, because the leading pad 2a acts as a barrier against the dust particles and the center step 3d has a projection at the leading end and deflects the dust particles.

On the other hand, the recess on the air inflow side of the center pad 2d enables the freedom of design for improving the CFH characteristics, the skew dependence characteristics, and the linear speed dependence characteristics. For example, as shown in FIG. 1B, the recess on the air inflow side of the center pad 2d is formed in substantially polygon shape, and points 7a through 7d can be changed to any positions in order to control the fly height and adjust the above-mentioned characteristics according to drive conditions. In addition, the shape of the center pad 2*d* on the air inflow side can be an arc shape, instead of a polygon shape, as long as there is a recess.

Figure 4:
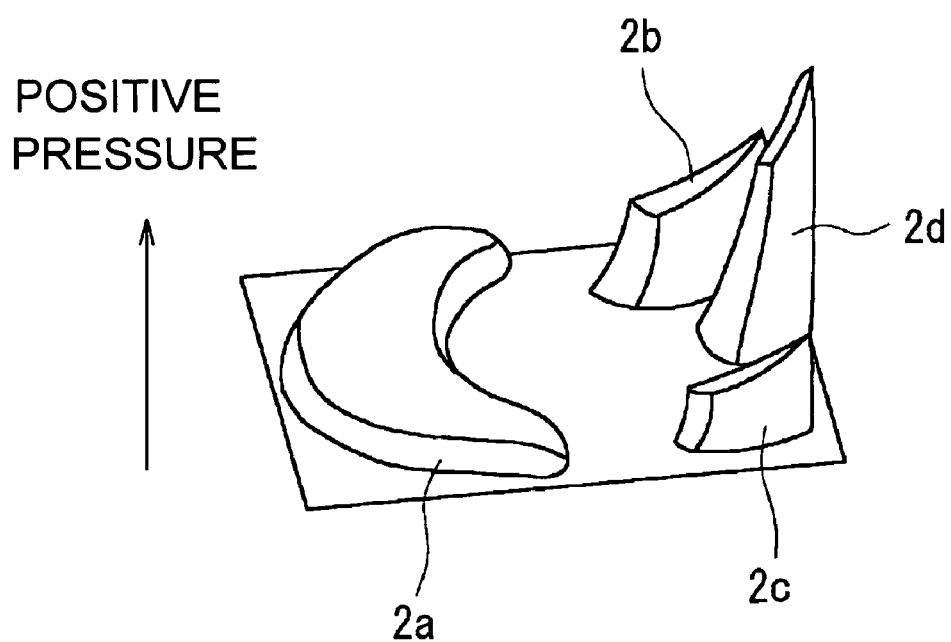
FIG. 4 is a graph showing an example of pressure distribution on the flying head slider of the first embodiment.

FIG. 4 is a graph showing an example of a pressure distribution on the flying head slider of the first embodiment. As shown in FIGS. 1A, 1B, the leading pad 2*a*, which is wide and is thicker at the center part, is at the front part of the flying head slider 1, while the side pads 2*b*, 2*c* are behind the flying head slider 1 and to the right and the left. As a result, as shown in FIG. 4, an adequately large positive pressure is generated at the front part and at the right and the left parts of the flying head slider 1. As a result, the flying head slider 1 achieves an adequate pitch and roll stiffness and is not likely to change flying position, lose fly height, or crash, even when the dust particles enter.

Figure 5A:
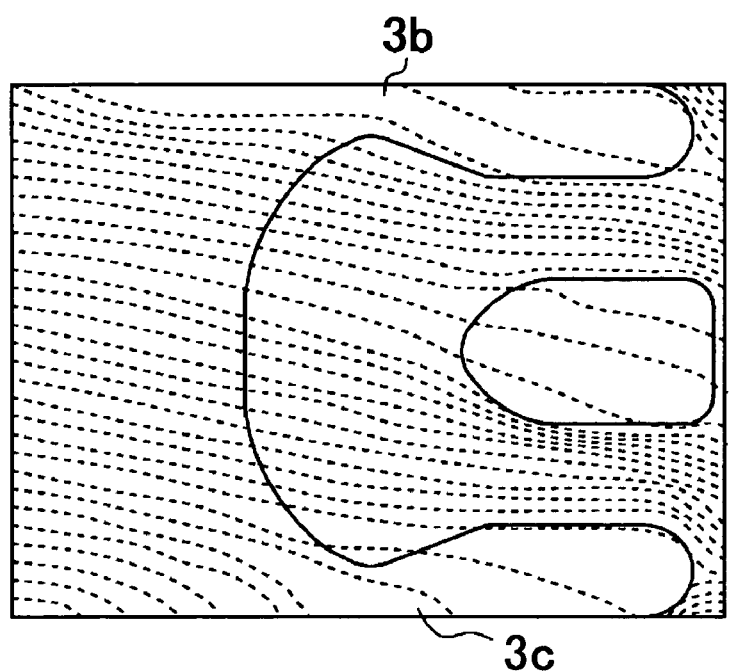
FIGS. 5A and 5B are explanatory diagrams comparing examples of an airflows.
Figure 5B:
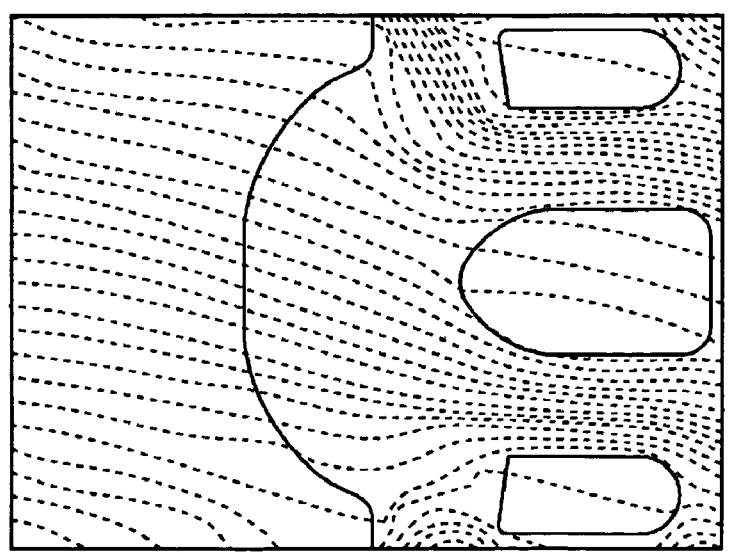

FIGS. 5A, 5B are explanatory diagrams that compare airflow. FIG. 5A shows airflow, when the flying head slider 1 includes the side steps 3*b*, 3*c* as in the first embodiment shown in FIGS. 1A, 1B. The side steps 3*b*, 3*c* inhibit the airflow from becoming disturbed. In comparison, FIG. 5B shows airflow, in the case where the flying head slider 1 does not include the side steps. From FIG. 5, it can be seen that the airflow is disturbed. When the airflow is disturbed, dust particles and lubricant can adhere at an eddy or stagnation. A design is required for ensuring an airflow that is as smooth as possible. Therefore, it is important to provide the side steps 3*b* and 3*c*.

Figure 6:
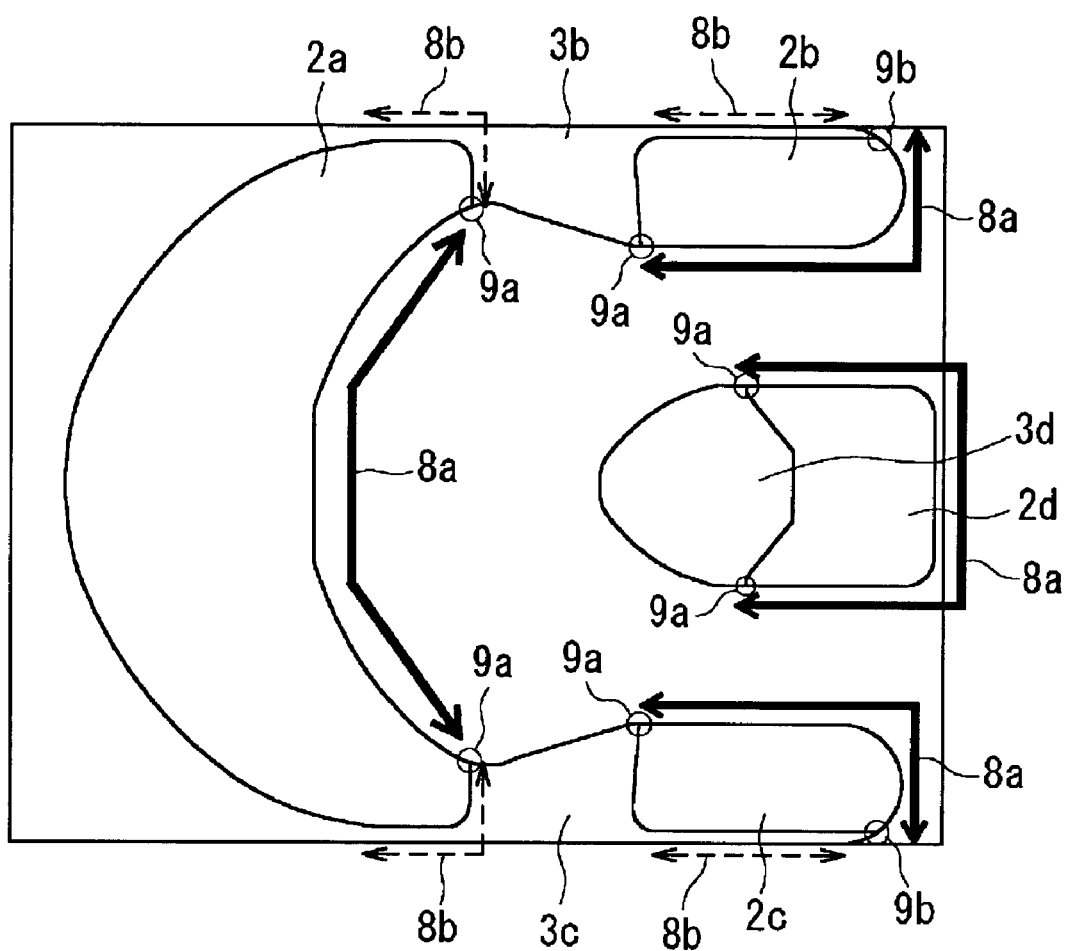
FIG. 6 is a plane view showing conditions at contours of the positive pressure generating surfaces of the flying head slider of the first embodiment.

FIG. 6 is a plane view showing contours of the positive pressure generating surfaces on the flying head slider 1 of the first embodiment. Shapes of main members of the flying head slider 1 of the first embodiment will be described next.

The steps 3 do not exist between the recess 4 and the leading pad 2*a*, the side pads 2*b*, 2*c*, and the center pad 2*d* at contour parts 8*a*, which are indicated by solid lines.

The contour parts 8*a* would be on the air outflow side with a range of skew angles of use. If there were shallow steps at these locations, the dust particles would easily adhere. For this reason, the recess 4 is placed directly next to the contour parts 8*a* without the steps in between.

On the other hand, contour parts 8*b*, which are indicated by dotted lines, would be on the air outflow side with the range of skew angles of use. The parts that are close to the side edges of the flying head slider 1, however, can also be on the air inflow side of the flying head slider 1. For this reason, the side steps 3*b*, 3*c* extend from the side faces of the leading pad 2*a* to the side edges of the flying head slider 1, as well as from the side faces of the side pads 2*b*, 2*c*, respectively, and the slider side edges, in order to more effectively inhibit the dust particles from entering at the air inflow side, instead of addressing the issue of dust particle adhesion on the air outflow side. Furthermore, if the side faces of the leading pad 2*a* and the side pads 2*b*, 2*c* were to extend out to the side edges of the flying head slider 1, chipping of the edge parts would be unavoidable during manufacturing. Therefore, it is advantageous to extend the side steps 3*b*, 3*c* from the slider side edges to the side face of the leading pad 2*a* and to the side faces of the side pads 2*b*, 2*c*, respectively also from the manufacturing standpoint.

Furthermore, the steps at the parts of connection between the leading pad 2*a* and the side steps 3*b*, 3*c*, respectively, are allowed, because an advantage of being able to inhibit the airflow disturbance is more significant than a disadvantage of particle adhesion. However, in order to inhibit dust particles from adhering, lengths of the connection parts between the leading pad 2*a* and the side steps 3*b*, 3*c* are minimized by making the side steps 3*b*, 3*c* narrower toward the leading end.

On the flying head slider 1, the contour lines of the positive pressure generating surfaces 2 and the steps 3 should preferably only consist of curved lines or of combinations of curved lines and tangent of the curved lines, without any discontinuity. However, as an exception, the curved lines would be discontinuous at interfaces 9*a* between areas, where the steps 3 are between the positive pressure generating surfaces 2 and the recess 4, and areas, where the steps 3 are not between the positive pressure generating surfaces 2 and the recess 4, as well as at cross points 9*b*, where the contour lines, where the positive pressure generating surfaces 2 are connected to the slider edge faces, are connected to the slider edge faces.

Figure 7:
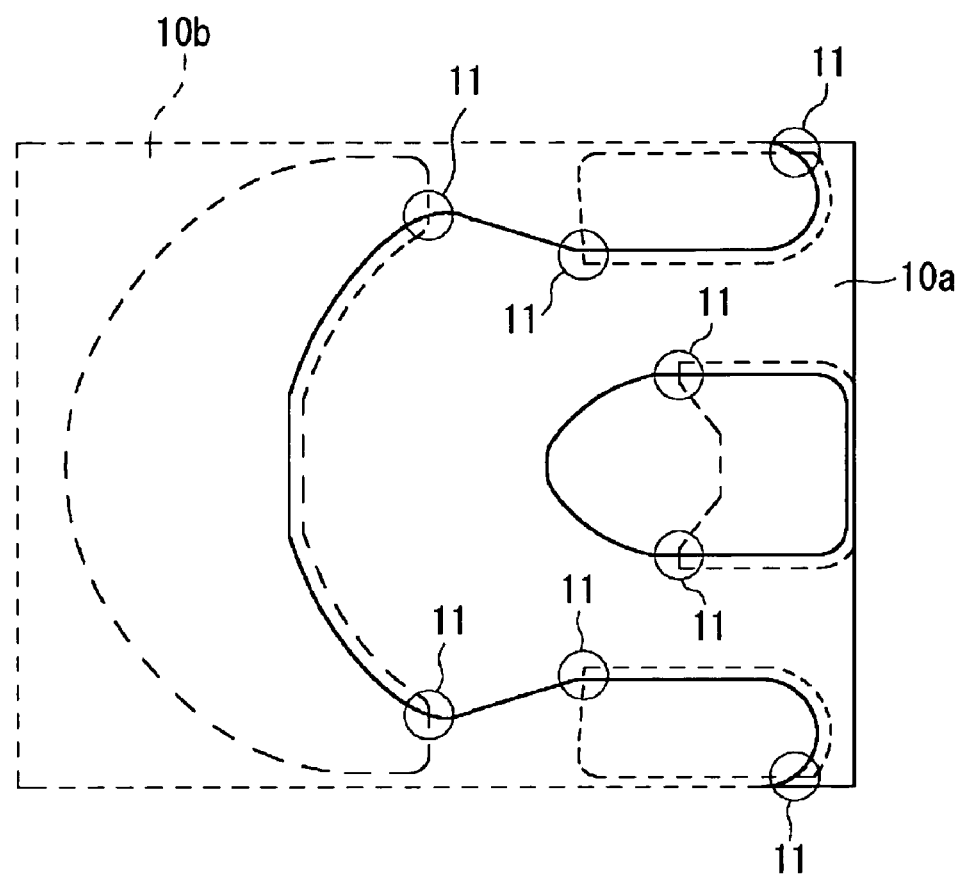
FIG. 7 is a plane view showing an example of a mask configuration.

These exceptions are due to two masks that are used for a step for forming the steps 3 and for a step for forming the positive pressure generating surfaces 2. In other words, FIG. 7 is a plane view that shows an example of a configuration of the masks, in which solid lines show contours of a mask 10*a* for forming the steps 3, while dotted lines show contours of a mask 10B for forming the positive pressure generating surfaces 2.

In a manufacturing process for the flying head slider 1, firstly the mask 10*a* is used for covering an area, where the steps 3 shown in FIG. 1 are to be formed, with a resist, while an area of the recess 4 is etched away. Next, the mask 10*b* is used for covering areas, where the positive pressure generating surfaces 2 are to be formed, with a resist, and the areas for the steps 3 and the recess 4 are etched away.

In the mask 10*b*, a part corresponding to the rear edge contour of the leading pad 2*a* and parts corresponding with inner side contours of the side pads 2*b*, 2*c*, namely, parts that face the recess 4, respectively, are enlarged in size with respect to the mask 10*a*.

Cross points 11, where patterns on the mask 10*a* and the mask 10*b* would cross each other, would be created as a result, and discontinuities in the contours of the positive pressure generating surfaces 2 would also be created. However, shaping the parts of the positive pressure generating surfaces 2 as such is advantageous from the manufacturing stand point, because adverse effects for the entire shape would be avoided, even if there were a slight misalignment between the masks.

Figure 8:
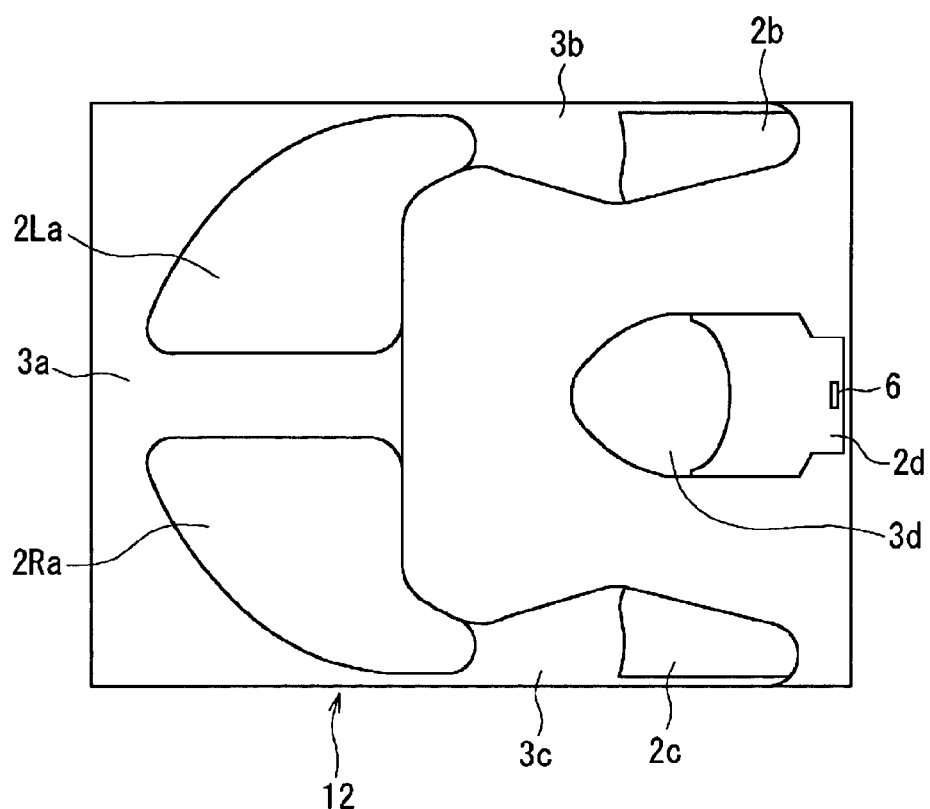
FIG. 8 is a plane view showing an example of a configuration of a flying head slider of a second embodiment.

FIG. 8 is a plane view showing an example of a configuration of a flying head slider of a second embodiment. A flying head slider 12 of the second embodiment includes two separate leading pads 2La, 2Ra with respect to a center line in a longitudinal direction of the slider.

The two separate leading pads 2La, 2Ra improve the roll stiffness and further enhances the slider fly height stability. Furthermore, side pads 2*b*, 2*c* include recesses on the air inflow side. When the side pads 2*b*, 2*c* include the recesses on the air inflow side, it is possible to control the fly height by changing the shapes of these recesses and thus achieve a greater design flexibility.

In the meantime, an amount of dust particles that might enter determines the optimal design, including whether to include a center groove and shapes of projections and the recesses on the side pads, which constitute a main difference between the flying head slider 1 of the first embodiment and the flying head slider 12 of the second embodiment. The design must be optimized experimentally according to foreseeable conditions in the drive in which the flying head slider will be used.

Figure 9:
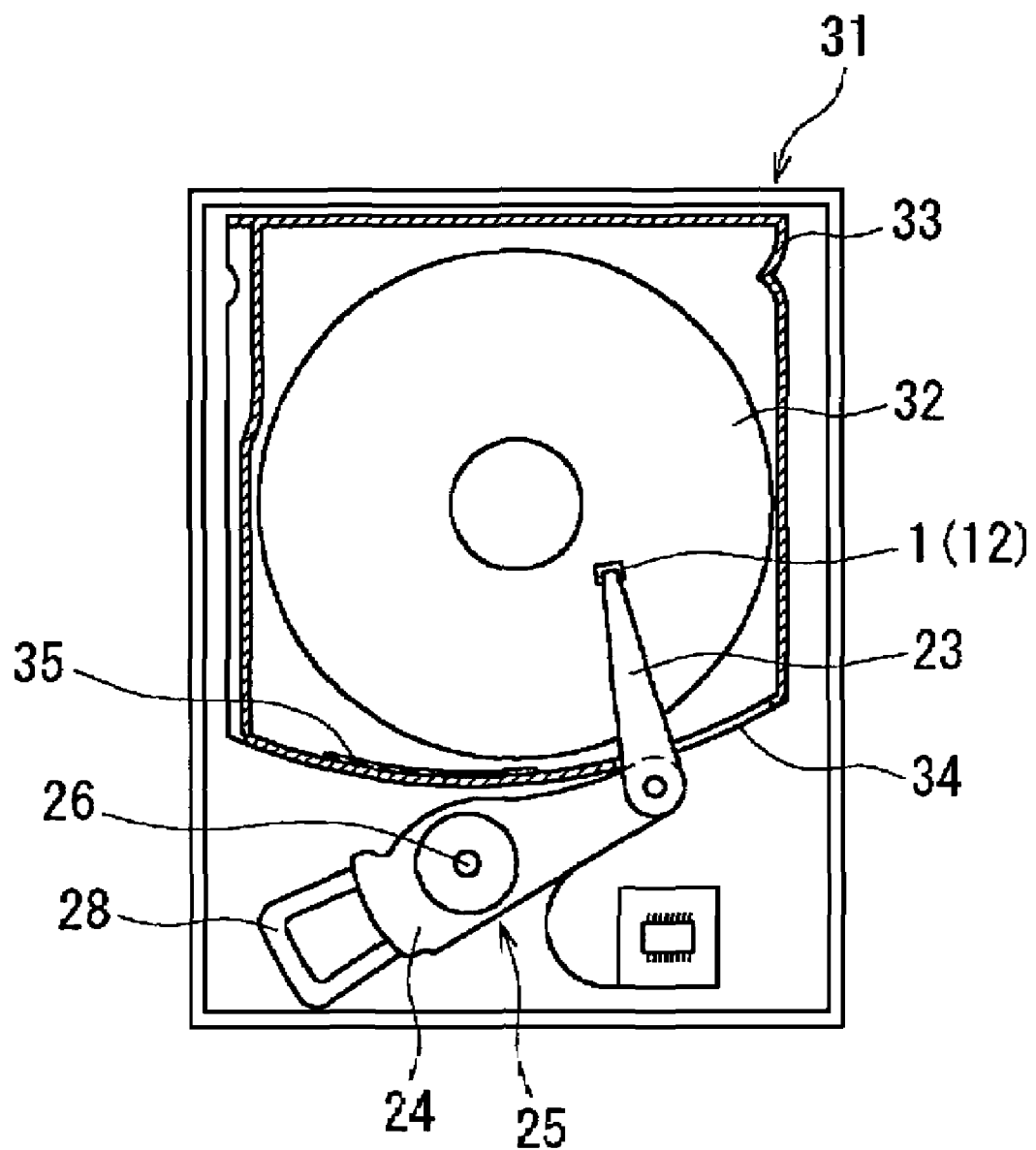
FIG. 9 is a plane view showing an example of a configuration of a hard disk drive of the second embodiment.
Figure 10A:
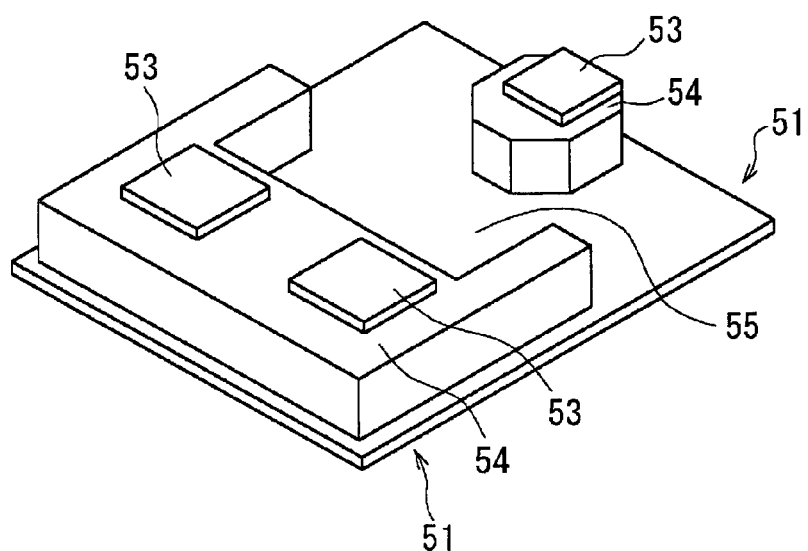
FIGS. 10A and 10B are plane views showing an example of a configuration of a flying head slider of a prior art.
Figure 10B:
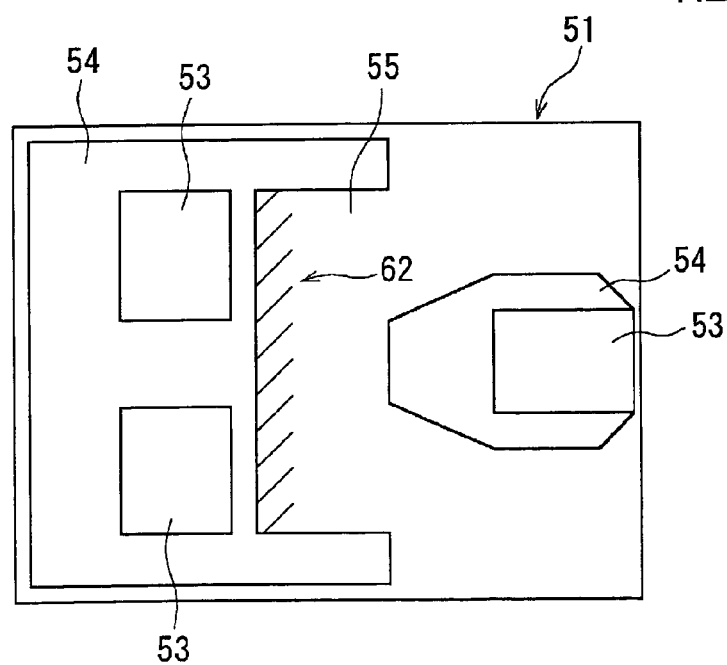
Figure 11:
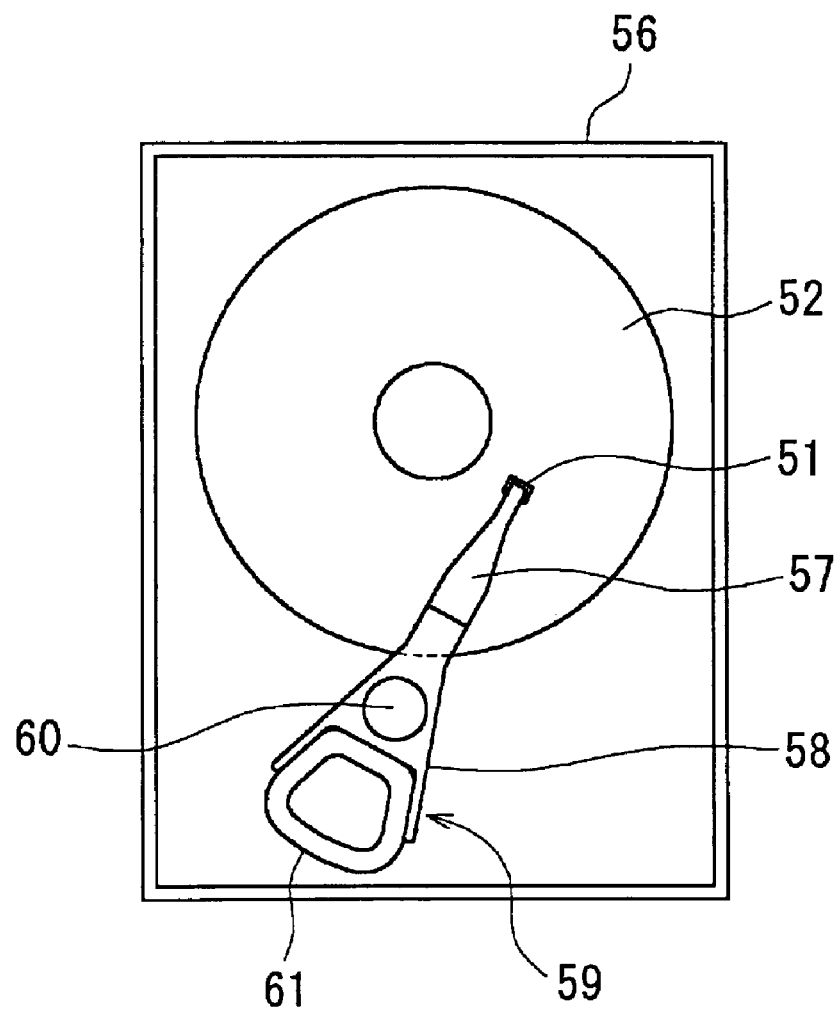
FIG. 11 is a plane view showing an example of a configuration of a hard disk drive of the prior art.

FIG. 9 is a plane view showing an example of a configuration of the hard disk drive of the second embodiment. An example of a variation of the hard disk drive will be described next. In FIG. 9, a cover, which is not shown in the figure, has been removed in order to describe an internal configuration of a hard disk drive 31.

The hard disk drive 31 of the second embodiment is called a removable drive, and a disk cartridge 33, which stores a disk 32, is attached to the hard disk drive 31 in a removable manner.

The disk cartridge 33 is in a shape of a thin box and includes an opening 34 on one side face. A shutter 35, which can be opened and closed, is placed on the opening 34. The shutter 35 covers the opening 34, when the disk cartridge 33 is removed from the hard disk drive 31, in order to protect the disk 32 inside the disk cartridge 33.

Although not shown in the figure, the hard disk drive 31 includes, for example, a mechanism for attaching the disk cartridge 33 in a removable manner and a spindle motor for rotating the disk 32 inside the disk cartridge 33.

An arm main body 24 of a head actuator 25 is fitted on a pivot 26 in a rotatable manner. Furthermore, the head actuator 25 is rotationally driven by a voice coil motor 28, which is placed on an opposite side from a suspension 23, with the pivot 26 sandwiched in between.

The suspension 23 extends toward the disk 32 and is attached at a prescribed angle with respect to the direction in which the arm main body 24 extends, and the head actuator 25 has a bent shape as in a plane view. The suspension 23 of the head actuator 25 enters through the opening 34 of the disk cartridge 33.

In the removable hard disk drive 31, dust particles can have a significant effect, even when a barrier structure against the dust particles, such as the shutter 35, is used, because the disk cartridge 33 is removable. For this reason, the effects of dust particles can be mitigated by taking advantage of the flying head slider 1 of the first embodiment or the flying head slider 12 of the second embodiment.

It should be noted that, the embodiments described above are preferred examples of the present invention and include various limitations that are preferred from a technological standpoint. However, the scope of the present invention is not limited to therein, unless specific limitations are described in the descriptions of the present invention.

What is claimed is:

1. A flying head slider that is incorporated in a disk storage apparatus, which records and reproduces information to and from a disk-shaped storage medium, wherein
    a face of said flying head slider, which faces said storage medium, comprises three types of surfaces, which are a positive pressure generating surface; a step that has a lower height than said positive pressure generating surface; and a recess that has a lower height than said step, wherein
    said positive pressure generating surface comprises:
        a U-shaped leading pad that comprises a projection on an air inflow side and is positioned at a front part of said slider;
        two side pads that are positioned behind said leading pad and to the right and the left side; and
        a center pad that comprises a recess on the air inflow side and is positioned between said two side pads and behind said leading pad; said step comprises:
        a leading step that extends from a front edge of said leading pad to a front edge of said slider;
        two side steps that extend from the behind of said leading pad and to the right and the left and to connect to said two side pads, respectively; and
        a center step that comprises a projection on the air inflow side and extends forward from a front edge of said center pad;
    said recess is formed at the peripheries of said center pad and of said center step, which are surrounded by said leading pad and said side steps;
    said side steps extend from side parts of said side pads to the side edges of said slider; form a width of said leading pad narrower than a total width of said slider; said leading step and said side steps are joined at the side parts of the slider and extend to the side edges of said slider;
    said side steps are wider at the rear;
    the rear edge of said center pad is positioned further behind the rear edges of said side pads; and
    a head is positioned near the rear edge of said center pad.

2. The flying head slider of claim 1, wherein said two side pads comprise projections on the air inflow side.

3. The flying head slider of claim 1, wherein said two side pads comprise recesses on the air inflow side.

4. The flying head slider of claim 1, wherein contour parts of said positive pressure generating surface, which are on an air outflow side with a range of skew angles of use, are directly connect and fall to said recess, without said steps in between, except at areas, that are also on the air inflow side and are connected to said side steps.

5. The flying head slider of claim 4, wherein the contour parts of said positive pressure generating surface are continuous and comprising only of curved lines and tangent of the curved lines at parts raised from said steps, and have discontinuous shapes at cross points between areas, where the contour parts are raised from said steps, and areas, where the contour parts are raised from said recess, and at cross points between areas where the contour parts are raised from said steps and slider edge faces.

6. The flying head slider of claim 1, wherein a shape of said leading pad is such that said leading pad is thickest at a center part and becomes gradually narrower toward both ends.

7. The flying head slider of claim 1, wherein said positive pressure generating surface, said steps and said recess are symmetrical with respect to a center line of a longitudinal direction of said slider.

8. The flying head slider of claim 1, wherein said leading pad is split into two parts in a width direction of said slider.

9. A disk storage apparatus comprising a disk shaped recording medium and a flying head slider having a head, which records and reproduces information to and from said recording medium, wherein
    a face of said flying head slider, which faces said storage medium, comprises three types of surfaces, which are a positive pressure generating surface; a step that has a lower height than said positive pressure generating surface; and a recess that has a lower height than said step, wherein
    said positive pressure generating surface comprises:
        a U-shaped leading pad that comprises a projection on an air inflow side and is positioned at a front part of said slider;
        two side pads that are positioned behind said leading pad and to the right and the left side; and a center pad that comprises a recess on the air inflow side and is positioned between said two side pads and behind said leading pad; said step comprises:

a leading step that extends from a front edge of said leading pad to a front edge of said slider;

two side steps that extend from the behind of said leading pad and to the right and the left and to connect to said two side pads, respectively; and a center step that comprises a projection on the air inflow side and extends forward from a front edge of said center pad;

said recess is formed at the peripheries of said center pad and said of center step, which are surrounded by said leading pad and said side steps;

said side steps extend from side parts of said side pads to the side edges of said slider; form a width of said leading pad narrower than a total width of said slider; said leading step and said side steps are joined at the side parts of said slider and extend to the side edges of said slider;

said side steps are wider at the rear;

the rear edge of said center pad is positioned further behind the rear edges of said side pads; and a head is positioned near the rear edge of said center pad.

10. The disk storage apparatus of claim 9, wherein said disk storage apparatus is a fixed type hard disk drive wherein said storage medium is incorporated and non-removable.

11. The disk storage apparatus of claim 9, wherein said disk storage apparatus is a removable hard disk drive, wherein said storage medium is stored in a cartridge and is attached in a removable manner.

* * * * *